United States Patent [19]
Jayne

[11] 3,882,736
[45] May 13, 1975

[54] APPARATUS FOR MAINTAINING AN OBJECT IN BOUNCING MOTION, AND FOR SENSING AND INDICATING THE POSITION AND/OR MOTION THEREOF

[75] Inventor: Theodore D. Jayne, Swarthmore, Pa.

[73] Assignee: General Technical Services, Inc., Upper Darby, Pa.

[22] Filed: July 26, 1968

[21] Appl. No.: 749,521

[52] U.S. Cl. .............................. 73/505; 73/517 R
[51] Int. Cl. ............................................ G01p 3/42
[58] Field of Search ............ 73/178, 505, 514, 517; 235/150.25; 244/3.2, 3.21; 273/118–122

[56] References Cited
UNITED STATES PATENTS

| | | | |
|---|---|---|---|
| 2,849,629 | 8/1958 | Kissinger | 73/514 |
| 2,960,872 | 11/1960 | Jones | 73/517 |
| 3,073,550 | 1/1963 | Young | 244/3.21 |
| 3,141,340 | 7/1964 | Boehm | 73/517 |
| 3,194,559 | 7/1965 | McCutcheon | 273/121 |
| 3,428,322 | 2/1969 | Motz | 273/123 |

FOREIGN PATENTS OR APPLICATIONS

| | | | |
|---|---|---|---|
| 188,696 | 11/1922 | United Kingdom | 73/505 |

*Primary Examiner*—Verlin R. Pendegrass
*Attorney, Agent, or Firm*—Howson and Howson

[57] ABSTRACT

To provide a "free" reference body for measurement of relative motion, a ball is maintained bouncing between a pair of opposed concave striking surfaces which are provided with an increasing inward cant toward the edges of the surface region struck by the ball. This surface configuration serves to oppose departures toward the edge of striking surfaces of the point of impingement of the ball, despite random variations in ball path and despite linear acceleration or rotation of the frame supporting the striking surfaces.

15 Claims, 13 Drawing Figures

PATENTED MAY 13 1975 3,882,736

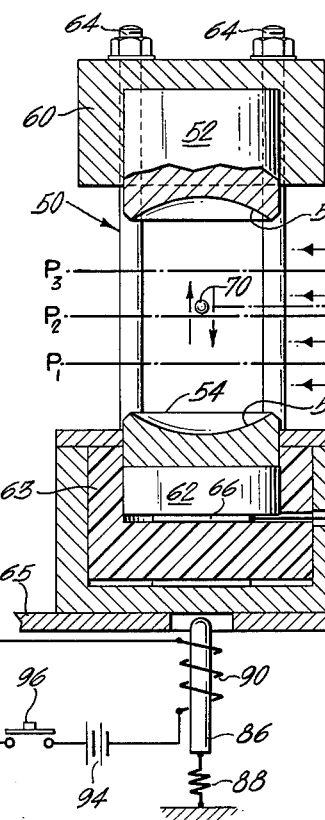

INVENTOR:
THEODORE D. JAYNE
BY Howson & Howson
ATTYS.

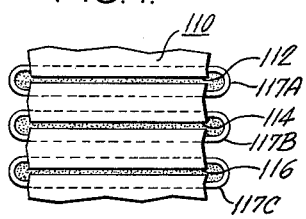
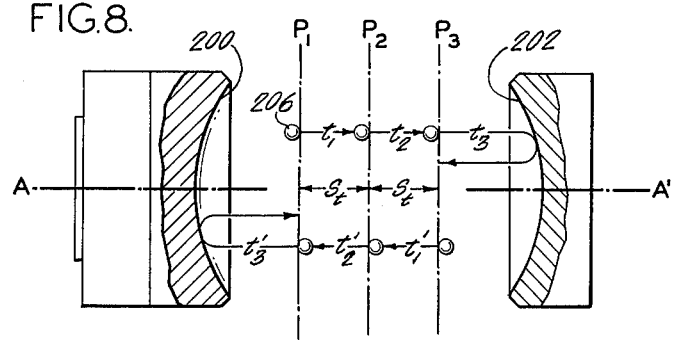
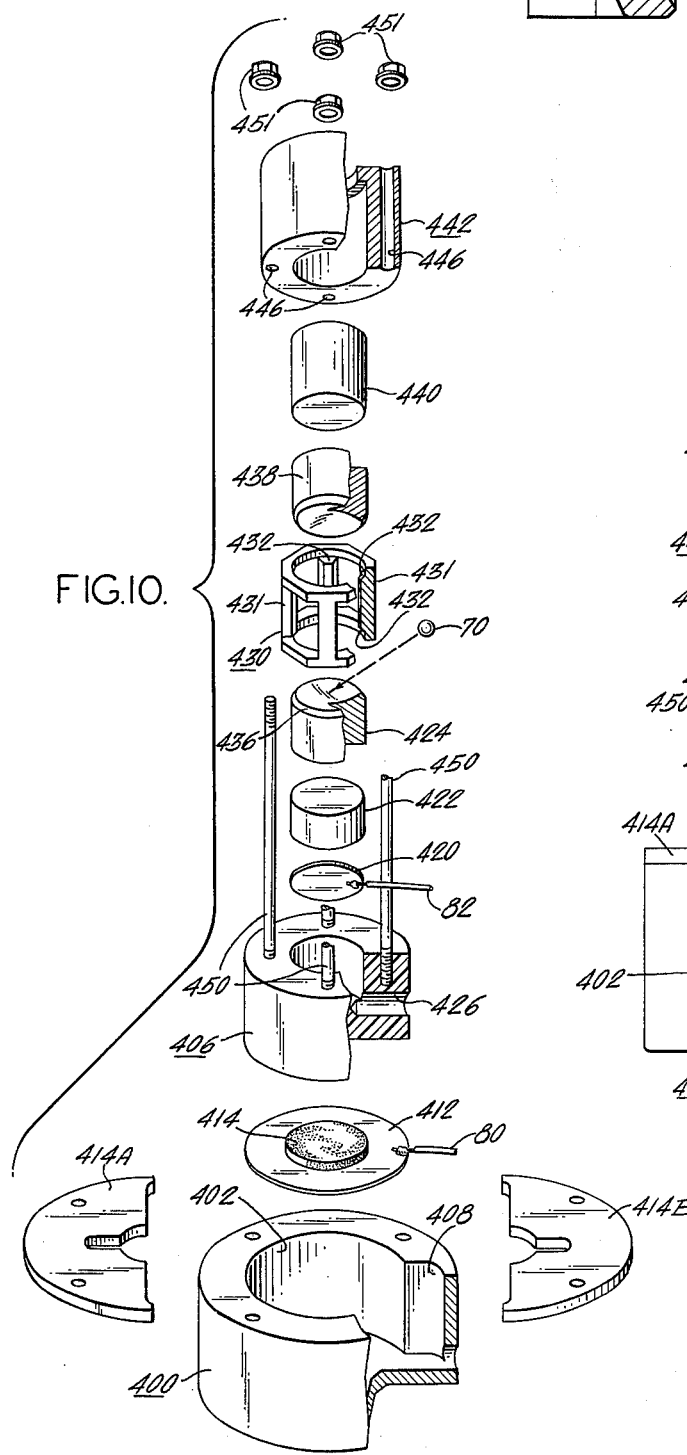
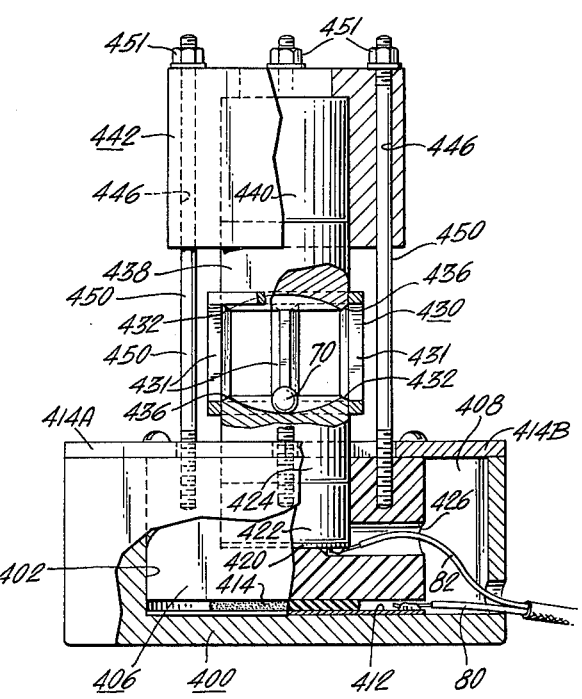

APPARATUS FOR MAINTAINING AN OBJECT IN BOUNCING MOTION, AND FOR SENSING AND INDICATING THE POSITION AND/OR MOTION THEREOF

The invention herein described was made in the course of or under a contract or subcontract thereunder, with the U.S. Department of Defense, Office of Naval Research.

BACKGROUND OF THE INVENTION

This invention relates to apparatus for maintaining an object in a bouncing state, and for sensing and indicating the position and/or motion of a bouncing object while it is free of mechanical constraints.

There are a variety of applications in which it is desired to sense and indicate the motion of an object, particularly its relative acceleration. For example, such information is commonly desirable in the testing of the performance of vehicles, such as a vehicle moving on a straight horizontal track, a vehicle moving with two degrees of freedom on a flat surface or a vehicle such as an air-borne or space vehicle which, at different times, may move with 1°, 2° or 3° of freedom of linear motion. However, beyond the mere deriving of test data, such information in may applications is also of great importance in enabling ascertainment of the position and motion of a vehicle for purposes such as navigation, guidance and control. In one important group of applications it is important to be able to sense acceleration of an object by means of apparatus carried with the object, as in the inertial guidance and control of air and space vehicles.

One type of acceleration sensor invented for the latter type of use is described and claimed in U.S. patent application Ser. No. 628,652 of Arthur S. Iberall, filed Apr. 5, 1967, now U.S. Pat. No. 3,559,478 and entitled Inertial Sensing System for Use in Navigation and Guidance, of common assignee herewith. The latter application makes use of the measurement of the motion of a vehicle with respect to an intermittently-free body carried along with the vehicle, and has important advantages over previous apparatus particularly in that accuracy is limited only by the ability to measure the time at which the body reaches predetermined positions with respect to the vehicle. More particularly, a body is released or set free with respect to the vehicle carrying it, and the motions of the released body and of the vehicle are compared. In order to obtain a number of repetitive measurements of free-body position relative to the vehicle, a plurality of bodies may be released in sequence, recaptured, and returned for release again in the region where their motion can be sensed. Optical means are preferably utilized to determine, with respect to each body while it is free of the vehicle, the times at which the body reaches each of three different positions spaced along a predetermined sensing direction or axis. The times required for each free body to travel the two successive path segments of known length defined by the three sensing positions provide information as to the velocity during two immediately-successive time intervals, and the differences in the velocities during these two intervals indicate the acceleration between the free body and the vehicle. If the body is entirely free, or if account is taken of any forces such as gravity acting on it, the acceleration so determined is also the absolute acceleration of the vehicle. Where desired, suitable computer apparatus may be supplied with the acceleration information to determine the velocity and/or positon of the vehicle. Similar arrangements for launching a series of balls and measuring their successive positions may be employed with respect to two other axes orthogonal to each other and to the first one, so as to provide complete linear displacement information. While effective for many purposes, the above-described prior-art arrangement is subject to the limitation that a ball redelivery system and/or a plurality of balls are necessary in order to provide continuing information as to object motion, with some degree of resultant complexity and expense.

A different system is described and claimed in U.S. patent application Ser. No. 642,649 of Arthur S. Iberall and Theodore D. Jayne, filed May 19, 1967 and now abandoned. In the latter system a single free body is used for a given sensing axis. The body is resilient, is caused to bounce back and forth in a container cell between a pair of opposed pedestals or striking surfaces, and is maintained in its bouncing condition by impulses of mechanical energy imparted to one of the pedestals when the ball is in contact with it. The orientation of the cell is automatically servoed along the direction of net relative acceleration so that, despite the tendency for applied transverse accelerations to cause the ball sooner or later to miss the pedestals, the bouncing ball remains nearly centered on the striking surfaces. When operating in a gravity field, the amount of angular displacement required to maintain the ball bouncing on the striking surfaces may be used to provide information as to the acceleration, from which a computer may derive information as to total velocity and distance, with respect to an initial velocity and position of the vehicle; alternatively, the above-mentioned optical position-sensing system may be used. While this single-ball system is useful in certain applications, it has the significant practical drawback of requiring an automatically-controlled mechanical servo system for orienting the cell in response to derived control signals, with resultant complexity, cost, bulk, weight, and limitation on reliability. Without such a servo system the ball will miss the pedestals when differently oriented, or when the vehicle is subjected to linear accelerations or to rotation, and the desired bouncing condition will be thereby terminated.

Accordingly, the first system referred to above does not require a mechanical servo system but does require moving mechanical elements for coordinating the retrieval and relaunching of one or more balls, and the second system referred to does not require complicated moving mechanical elements to supply successive balls but does require such elements for orienting the cell.

In some cases it is also desirable to determine the acceleration of an unsupported body in order to derive information as to the fields acting thereon, for example to measure the value of the acceleration of gravity. The above-cited copending applications describe and claim apparatus which can be used for this purpose, in which case the vehicle may be held fixed with respect to the source of gravity field and the motion of the free body with respect to the vehicle detected. However, to obtain repetitive measurements automatically, the above-described relatively complex mechanical equipment is utilized with its attendant drawbacks.

Accordingly, it is an object of the invention to provide new and useful apparatus for sensing and indicating the motion of an object such as a vehicle.

A further object is to provide such apparatus which does not require mechanical servo mechanisms for controlling orientation of the cell apparatus.

A further object is to provide such apparatus which does not require use of a plurality of free bodies, or the capture and relaunching of one or more free bodies.

It is also an object to provide such apparatus which, by measurements of positions of a single bouncing ball during its free travel, derives information as to the acceleration of the vehicle carrying the apparatus, without requiring special additional apparatus for varying the orientation of the cell containing the bouncing ball with respect to the vehicle carrying it.

It is also an object to provide such apparatus in which information as to acceleration along each of three mutually orthogonal coordinate directions may be derived from a single bouncing ball.

Another object is to provide new and useful apparatus for determining the strength of an accelerative field, for example a gravity field.

A further object is to provide new and useful apparatus for maintaining a body in a bouncing state.

Another object is to provide such apparatus for maintaining a body bouncing between a pair of opposed striking surfaces.

SUMMARY OF THE INVENTION

In accordance with the invention, these and other objects are achieved by the provision of apparatus for maintaining a body in a bouncing state, said apparatus comprising a supporting frame, a striking surface on said frame, and means for bouncing said body against said striking surface, characterized in that said striking surface is configured to oppose departures toward the edge of said surface of the point of impingement of said body thereon. Accordingly, when the point of impingement of the bouncing body tends to move to and beyond the edge of the striking surface, it is prevented from so doing by the configuration of the striking surface against which it bounces, despite substantial relative transverse accelerations or accelerative forces acting between the body and the frame and despite substantial rates of rotation of the frame. Accordingly, a single bouncing ball can be utilized in a motion-sensing system without requiring changes in the orientation of the striking surface in order to maintain the bouncing condition.

Preferably the configuring of the striking surface which provides these desired results includes an inward canting of the striking surface, which canting increases toward the edge of the striking surface. With this construction, the farther the point of impingement moves toward the edge of the striking surface, the greater the angle of the striking surface and the greater its effect in retaining the point of impingement on the striking surface. Preferably this inward canting increases toward all edges of the striking surface, so that the retaining effect of the surface configuration is provided for all directions of travel of the point of impingement of the body.

In a preferred embodiment the striking surface is a concave figure of revolution, such as a substantially spherical surface, and preferably two opposed striking surfaces are utilized between which the body is bounced; the second striking surface is preferably also configured so as to oppose departures of the point of impingement toward the edge thereof, and in the preferred embodiment the two striking surfaces are substantially the same in size and shape.

A container cell for a bouncing ball utilizing striking surfaces configured in accordance with the invention has been found operative to retain the ball in its bouncing condition between the two opposed pedestals despite substantial transverse relative accelerations between cell and ball, and despite substantial rates of rotation of the cell. Accordingly, the ball can be maintained bouncing, and its position sensed when free of contact with the striking surfaces, over a substantial range of variation in acceleration and orientation of the frame supporting the cell, thereby making the cell useful, for example, for the sensing of acceleration in a variety of applications without requiring servoing of the orientation of the cell.

These and other objects and features of the invention will be more readily understood from a considertion of the following detailed description, taken in connection with the accompanying drawings, in which:

FIG. 7 is a plan view of a segment of a slit device utilized in the embodiment of FIG. 6;

FIG. 8 is a diagram with reference to which the theory of the invention will be described;

FIG. 9 is a vertical section of one preferred form of cell constructed in accordance with the invention;

FIG. 10 is an exploded perspective view of the cell of FIG. 9;

DETAILED DESCRIPTION OF PREFERRED EMBODIMENTS

Figure 1:
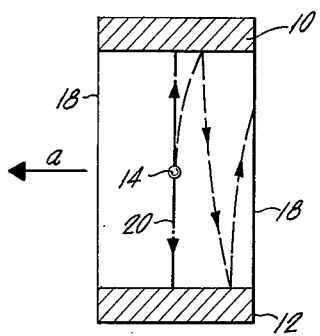
FIGS. 1 through 5 and 5A are diagrams to which reference will be made in explaining certain differences between the operation of prior-art devices and those of the invention, FIG. 3 representing a section along lines 3—3 of FIG. 2 to show the shape of the pedestals in two dimensions.

FIGS. 1–5 illustrate schematically some of the problems arising in prior-art devices and the general nature of their solution in accordance with the invention. FIG. 1 represents a pair of opposed, plane-parallel pedestals 10 and 12 of hard resilient material between which is bounced a hard resilient spherical ball 14. The pedestals are held spaced apart by appropriate supporting rods such as 18. If the container cell of FIG. 1 is placed upright in a gravitational field and is at rest, and all other conditions are ideal, once the ball 14 is placed into its bouncing state at right angles to the pedestal surfaces 10 and 12 it will continue at first to bounce along nearly the same path, indicated in full line at 20. However, even minor imperfections in the initiation of bouncing or in the surfaces involved, or any other interfering effects, will soon cause the point of impingement of the ball upon the pedestal surfaces to wander about the pedestal surfaces and in time reach the edge of one of the pedestals and miss it completely. Under such circumstances, the ball will leave the cell if the sides of the cell are open; if the sides are closed, it will strike a sidewall of the cell and will then pursue an irregular unpredictable course within the cell. Such unpredictable course will, in general, not include the desired regular bouncing contact with the pedestals, and where, as is usual, the energy for maintaining the bouncing is applied by way of a pedestal, will result in a slowing of the ball. Furthermore, contact with the interior of the container, whether with the pedestals or the sidewalls, will in general occur at an angle far from normal incidence so that rolling components will begin to appear in the ball motion. The combination of the change in angle of incidence of the ball and the slowing of the ball, or either one alone, is generally sufficient to cause the ball to begin rolling and otherwise assuming a motion which is unsuitable for reliable, repetitive, and meaningful measurements of its motion.

When the container cell is accelerated to the left in FIG. 1, the ball will lag behind the cell during its transit between opposite pedestals, the path under such conditions being indicated by the broken-line curves in FIG. 1. It will be seen that after some number of ball transits, determined by the strength of the transverse acceleration, the ball will fail to reach an opposite pedestal, and will instead leave the cell or strike a sidewall, introducing the aforedescribed random unpredictable ball motion, generally including rotational components thereof and ultimately a rolling along the container surfaces.

Figure 2:
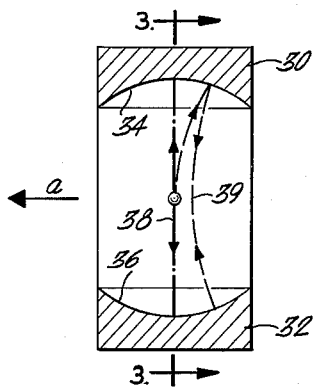
Figure 3:
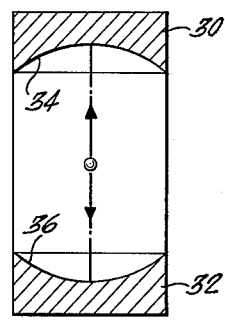

FIGS. 2 and 3 illustrate schematically a container cell embodying the invention in one form in which the flat pedestals 10 and 12 of FIG. 1 are replaced by corresponding pedestals 30 and 32 having confronting interior striking surfaces 34 and 36 which are concave toward each other, and which in this example may be assumed to be spherical surfaces, i.e. surfaces which are part of a sphere or approximately so. If the cell is oriented vertically in a gravity field as suggested in FIG. 2, and not accelerated, the bouncing ball will tend to be stabilized in generally central position with respect to the pedestals as indicated by the solid line 38, despite tendencies for random motion of the points of impingement of the ball on the pedestals. Furthermore, while acceleration of the container cell to the left in FIG. 2 again will cause an apparent curvature of path of the ball with resect to the cell as indicated by the dotted line 39, in this case the ball is still maintained bouncing between the opposed pedestals. This is because the new, more peripherally-located portions of the pedestal struck by the ball when the cell is accelerated are canted more severely inwardly, so as to cause the ball to bounce back toward the middle of the cell. In striking the opposite pedestal, the ball also impinges a more inwardly-canted portion of the pedestal so as to bounce back toward the center line of the cell. Because the inward canting increases toward the edges of the striking surfaces, the greater the tendency for the point of impingement of the ball to travel toward the edge of the striking surface the greater is the restoring effect of the canting of the striking surface. Accordingly, while exceedingly high accelerations of the container cell may cause the impingement point of the ball to move off the pedestals, it will be retained or stabilized in a bouncing condition between the pedestals despite random variations in bouncing motions and despite accelerations of the cell normal to the ball path, over a substantial and useful range of such accelerations.

Figure 4:
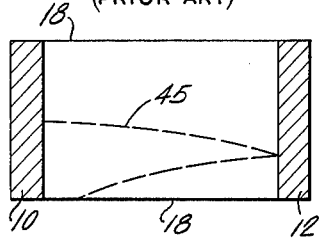

FIG. 4 illustrates a prior-art type of bouncing-ball cell in an orientation in which the plane-parallel bounce surfaces of pedestals 10 and 12 are vertical and the bouncing energy imparted to the ball by the pedestals is generally horizontal. It is assumed in FIG. 4 that the cell is in a downwardly-directed gravity field, and, as represented by the solid line path 45, the ball effectively "falls out" of the desired region between the bounce pedestals and strikes the cell side-surfaces or leaves the cell.

Figure 5:
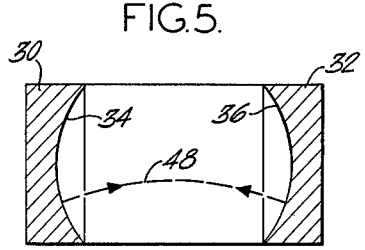

In contrast to FIG. 4, FIG. 5 represents schematically a cell in accordance with the invention utilizing concave pedestals as in FIG. 2, and in this instance while the gravitational field produces some displacement of the ball path 48 and forces it to form an arc, the progressive inward (in this case also upward) canting of the lower edges of the curved pedestals gives to the ball initial upward components of velocity at each pedestal, so that it is retained in a bouncing arc within the confines of the pedestals as desired. The retaining action of the curved pedestals is therefore similar whether the relative motion of the ball transverse to the cell axis is due to acceleration of the container cell or due to accelerative forces acting on the free ball during its transit.

Accordingly, by employing the inventive arrangement the single ball is constrained to move along generally with the container cell and yet, during its free-flight times, it provides a suitable reference body with respect to which measurements may be made to determine relative motion between cell and free body. Accordingly, the need for the recapture and re-release mechanisms and for the position-orienting servo mechanisms of the prior-art arrangements is obviated.

There are a large variety of ways in which the cell of the invention can be utilized for motion-sensing purposes. In general, the information derived from the bouncing ball, the manner of its derivation, and the means and manner of maintaining the ball in its bouncing condition may differ widely in different applications, depending upon such factors as the ultimate information to be derived, the type of external field to which the cell and ball may be subjected, and the nature of the motions to be applied to the cell. By way of example only, there will now be described in detail one specific embodiment of the invention in a form and in a system in which may be utilized as a gravimeter for measuring the value of the acceleration of gravity, or as an accelerometer for measuring the vertical acceleration component of a vehicle carrying the cell, or as an accelerometer for measuring the acceleration of a vehicle along a straight, flat, horizontal track, as examples.

Figure 6:
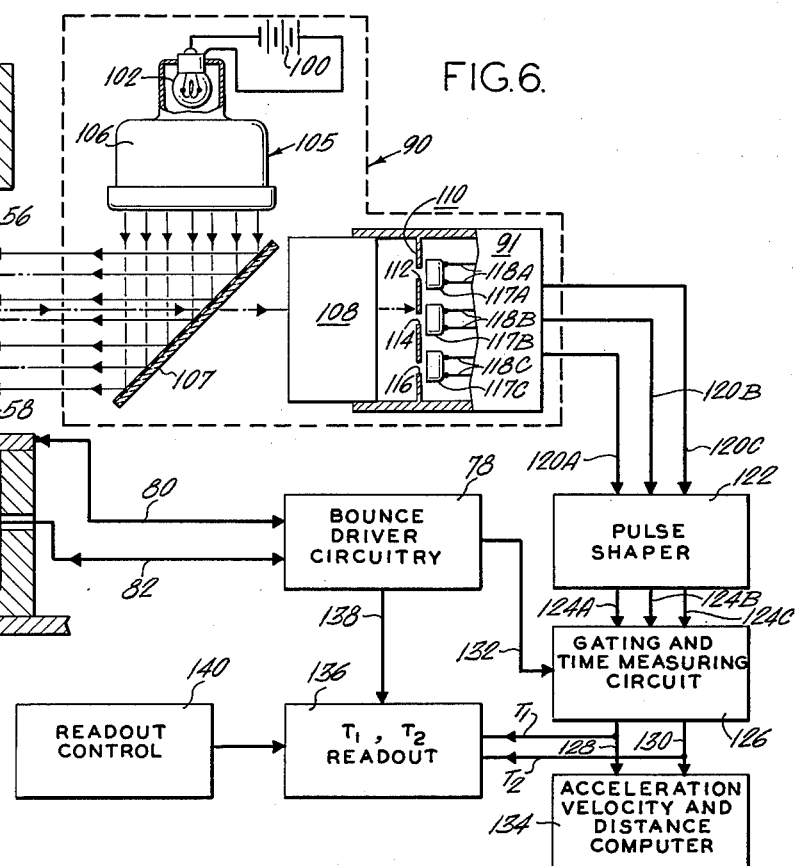
FIG. 6 is a schematic illustration, partly in block form, of one embodiment of the invention.

Referring now to FIG. 6 illustrating one such form of system employing the cell of the invention, the cell represented at 50 comprises a first pedestal 52 and an opposed lower pedestal 54, each of which is circular in horizontal cross-section and has an interior concave striking surface of generally spherical form as shown at 56 and 58, respectively. Upper pedestal 52 is mounted on the lower side of a relatively massive backing block 60 while pedestal 54 is mounted on the upper surface of a piezoelectric disc 62, which in turn is insulated and mounted in a recess in a mounting block 63. The pedestals 52 and 54 are held in position by any appropriate mounting means, such as rods 64, which are few enough in number and sufficiently spaced apart to enable a clear view through the cell from the sides at least at one angle and in some cases at several angles, so as to permit optical sensing of the position of the ball within the cell 50 without interference from the rods.

The cell 50 may be supported on a support frame 65.

The ball 70 of hard resilient material is given impetus to bounce back and forth between the striking surfaces 56 and 58 of the curved pedestals by pulsed actuation of the piezoelectric element 62. The piezoelectric element may be of conventional form, having one electrode 66 on its lower surface, metal pedestal 54 serving as the other electrode. Piezoelectric element 62 is responsive to voltage pulses applied between electrode 66 and pedestal 54 to cause the piezoelectric material to expand along the direction between its major surfaces and thus impart an upwardly-directed mechanical impulse or shock wave to the lower side of pedestal 54, which wave is transmitted through the pedestal to the striking surface 58 thereof; also, a compressive impulse applied between the top and bottom major surfaces of piezoelectric element 62 will produce a voltage pulse between electrode 66 and pedestal 54. By applying mechanical impulses to surface 58 when ball 70 is in contact with it, translational kinetic energy is imparted to the ball to make up for energy lost in bounce of the ball and thereby to maintain it in its bouncing state.

The voltage pulses for operating the piezoelectric element 62 are supplied from bounce driver circuitry 78. In order to produce output pulses from the bounce driver circuitry at the proper times to maintain bouncing of the ball, the times of impingement of the ball upon the lower pedestal 54 are sensed to produce control pulses for triggering the bounce driver circuitry into operation. In the present example, the initial contact of ball 70 against striking surface 58 produces a shock wave in pedestal 54 which travels through it to the upper surface of piezoelectric element 62, and the resultant instantaneous pulse of pressure between the opposite major surfaces of the piezoelectric element induces an output voltage pulse between electrode 66 and pedestal 54 which is applied to the bounce driver circuitry 78 as a triggering impulse. In response to this triggering impulse, the latter circuitry nearly instantaneously returns a driving pulse along the same connecting leads 80 and 82, causing the piezoelectric element to deliver an upward impulse to the ball while it is still in contact with the pedestal 54. Suitable apparatus for providing this operation is described in more detail hereinafter.

A variety of methods will occur to one skilled in the art for intitiating the bouncing of ball 70. One way this can initiating done is to apply momentarily an external rapidly-repetitive trigger to the bounce driver circuitry 78, to cause it to produce a burst of drive pulses for exciting the pedestal 54. This is generally sufficient to raise the ball and cause the inception of automatic bounce drive. However, the cell 50 is also responsive to a mechanical tap against the bottom of the support block 63 to initiate the desired bouncing operation, and in the present example the bounce-starting apparatus comprises a solenoid plunger 86, normally restrained by an appropriate spring 88 from contacting the undersurface of support block 63 but responsive to current through the solenoid coil 90 to cause the plunger 86 to move upwardly and strike the lower surface of block 63. Current for the solenoid coil may be supplied by any appropriate current source 94, by way of a momentary-contact, manually-operable, normally-open switch 96. Accordingly, by momentarily closing switch 96 the ball will be given an initial impetus to put it into its bouncing condition, in which it is maintained by the triggered operation of the bounce driver circuitry 78 so long as the ball continues to strike the striking surfaces 56 and 58 on each transit.

A variety of different means may also be utilized to sense the vertical position of the ball 70 as it passes upwardly (as viewed in FIG. 6) and sequentially through the different horizontal planes $P_1$, $P_2$ and $P_3$. Preferably the presence of the ball at each of these positions is detected by means of optical sensing apparatus. In one form of optical sensing apparatus the shadow of the ball may be utilized as an indication of its position. In the present example it is preferred to utilize a shiny, highly reflective spherical ball and to employ reflections from the ball as indications of its position.

More particularly, in the embodiment illustrated schematically in FIG. 6 the arrival of the upwardly-traveling ball at the successive different initial positions defined by planes $P_1$, $P_2$ and $P_2$ is detected by means of the optical sensing apparatus 90 shown within the broken outline and fixed to frame 65. In general, the optical sensing apparatus in this example projects light in parallel rays at right angles to the longitudinal axis of the cell 50, and the reflection from the ball, acting as an effective point source of light, is imaged on the screen of a photosensitive device 91 which is sensitive only along three narrow horizontal lines corresponding to the planes $P_1$, $P_2$ and $P_3$, so that the photosensitive device 91 produces output pulses only as the ball passes through the levels $P_1$, $P_2$ and $P_3$.

More particularly, a D.C. source 100 may supply operating current to a lamp 102. Light from the lamp 102 is applied to, and rendered parallel by, a suitable conventional lens system 105, the lens system and light source being contained within a suitable housing 106 which is opaque except for the transparent end through which light passes from the lens system 105 to the exterior in parallel rays. The latter parallel rays are applied to a half-reflecting mirror 107 disposed at 45° to the rays, so that a portion of the parallel light is reflected into the cell 50 from the side, between the rods 64 and at right angles to the longitudinal dimension of the cell. It is understood that a conventional beam splitter may be used in place of mirror 107, and that a suitable light-absorptive background is provided on the side of the cell opposite that to which light is applied so that light is reflected back to the mirror 107 substantially only from the shiny ball 70. The light reflected from ball 70 passes backward to, and at least partially through, half-reflective mirror 107 to lens system 108 and thence to a slit device 110 at the face of photoresponsive device 91. The optical system is preferably such that the vertical image of lamp 102 formed by ball 70 is imaged on slit device 110.

As shown more clearly in FIG. 7, slit device 110 is opaque except for the narrow transparent horizontal lines 112, 114 and 116, which are transparent. The slit device 110 may take any of many known forms, and may for example be separate from, secured to, or integral with, the face of the photo-rersponsive device 91. Similarly, photoresponsive device 91 may take any of a variety of known forms, and may for example be a vacuum phototube having a photosensitive surface positioned to be impinged by light passing through slit device 110, the tube being provided with conventional operating voltages. In the latter case an output voltage will be produced each time any of the transparent lines of the slit device is illuminated from the exterior; it will be understood that the slit device and the photoresponsive device are shielded from stray light. In the case illustrated, three separate photosensitive elements 117A, 117B and 117C and three pairs of conductive leads 118A, 118B and 118C are used, one for each of the transparent lines, thereby providing separate output leads for signals produced by the three transparent lines. The separate photosensitive elements may be semiconductor devices, to eliminate the need for a vacuum tube and to obtain greater compactness and reliability. The system is therefore such that a voltage pulse is produced at output leads 120A, 120B and 120C of photoresponsive device 91 each time the ball 70 is in one of the planes $P_1$, $P_2$ or $P_3$, respectively.

The function of the remainder of the system is then to measure the times between the successive pulses on output leads 120A, B and C, and to derive therefrom information such as cell acceleration, velocity, or displacement, or values of acceleration of gravity, as examples, Appropriate timing circuits are, or course, also included to provide the necessary coordination and synchronization between the elements of the system.

It will be apparent to one skilled in the art how the circuitry may readily be adapted to measure the times required for the ball to pass from $P_1$ to $P_2$ and from $P_2$ to $P_3$ in one direction of transit, and also to provide measurement of the time required for the ball to go from $P_3$ to $P_2$ and from $P_2$ to $P_1$ in the opposite direction of transit of the ball. In the interest of simplicity, it will be assumed in the present example that these measurements are made for only one direction of transit of the ball, namely the transit from lower pedestal 54 to upper pedestal 52. One simple way to effect such operation, for example, is to use pulses from the bounce driver circuitry 78 to render the time-measuring circuitry effective immediately after each bounce pulse until three output pulses have been produced by the photoresponsive device 91, at which time the measuring circuit is rendered inoperative until the occurrence of the next bounce pulse.

Accordingly, in FIG. 6 the output pulses at leads 120A, B and C are applied to a pulse shaper 122 which is effective to provide corresponding pulses at output leads 124A, 124B and 124C, respectively, having narrow peaks occurring simultaneously with passage of the ball image over the transparent lines 112, 114 and 116, respectively. The latter pulses are applied to the gating and time-measuring circuit 126, which may for example comprise a clock-pulse generating circuit and a counter for the clock pulses; the counter provides at output lead 128 a count $T_1$ corresponding to the number of clock pulses produced between each $P_1$ plane-representing pulse and the following $P_2$ plane-representing pulse, and at output lead 130 a clock pulse count $T_2$ indicating the number of clock pulses occurring between each $P_2$ plane-representing pulse and the following $P_3$ plane-representing pulse. The connection 132 from bounce driver circuitry 78 to the gating and time-measuring circuit 126 provides the above-described function of rendering the circuits 126 operative during each upward transit of ball 70 until three plane-representing pulses have been produced, but rendering circuit 126 inoperative during the downward transit of ball 70.

Accordingly, the $T_1$ signal indicates the time for the ball to travel from the level $P_1$ to the level $P_2$, and the $T_2$ signal represents the time required for the ball to travel from level $P_2$ to level $P_3$ in cell 50. Since the distances between the transparent lines 112, 114 and 116 of slit device 110 are accurately known, and therefore the distances $P_1$ to $P_2$ and $P_2$ to $P_3$ are also accurately known, the average ball velocity $V_1$ relative to the cell in the interval $P_1$ to $P_2$ and the average ball velocity $V_2$ relative to the cell in the interval $P_2$ to $P_3$ are readily computable from the signals $T_1$ and $T_2$. Since the two different velocities $V_1$ and $V_2$ are thereby known, and the distance within which the velocity change $V_1 - V_2$ occurs is also known, the acceleration of the ball 70 with respect to the cell 50 can also be computed. Once the acceleration has thus been computed, other information as to motion can readily be computed, such as the accumulated velocity of the cell 50 and frame 65 with respect to free space or the distance which the cell and frame have moved from a reference position. For these general purposes the $T_1$ and $T_2$ signals from leads 128 and 130 are supplied to an acceleration, velocity and distance computer 134. In the example shown, the $T_1$ and $T_2$ signals are also supplied to a $T_1$, $T_2$ readout 136, which is also supplied with control signals from bounce driver circuitry 78 by way of lead 138. Readout 136 is designed in known manner to receive the $T_1$, $T_2$ information and to display or readout the values of $T_1$ and $T_2$ existing at the time of operation of a readout control 140, which may be manually actuatable by an operator.

To operate the system of FIG. 6 as a gravimeter, the optical system 90 may be initially aligned vertically and at rest with respect to the earth, in which event the ball 70 will be kept bouncing and stabilized on the striking surfaces of the two opposed concave pedestals 52 and 54, the optical sensor system 90 then providing the desired indications of the times at which the ball reaches the successive positions $P_1$, $P_2$ and $P_3$ and the remainder of the system operating to produce in computer 134 an indication of the value of the acceleration of gravity. In this case, since there is no applied kinetic acceleration of the cell 50, the differences in ball velocity during successive time intervals are due entirely to the acceleration of gravity. The $T_1$, $T_2$ readout 136 is conveniently operable as a check of the operation of the equipment, and may be sequentially operated to check the reproducibility of the measurements and the functioning of the equipment. In this type of application of the cell, the curved striking surfaces 56 and 58 prevent the ball from wandering off the pedestals due to random motions having a cumulative effect over a period of time, there being, however, no substantial consistent horizontal force applied to the ball and no transverse acceleration of the cell with respect to the ball.

If the equipment represented in FIG. 6 is accelerated directly vertically in the earth's gravitational field, the difference between $T_1$ and $T_2$ will increase as a function of the value of the upward acceleration, and accordingly the upward acceleration can readily be calculated from the differences in $T_1$ and $T_2$; the direct calculation gives the sum of the accleration of gravity and the linear motional acceleration applied to the cell 50, from which the motional acceleration of the cell can be obtained by subtracting the value of the acceleration of gravity, known from other sources.

Alternatively, the equipment of FIG. 6 may be mounted on a vehicle which is accelerated along a straight, flat, horizontal track. This produces the cell situation shown schematically in FIG. 2, in which the bouncing ball tends to be left behind the cell and has an apparent curved path with respect to the cell. However, as described hereinbefore, the curved nature of the concave opposed pedestals causes the ball to be retained within the cell despite acceleration of the cell transverse to its longitudinal axis. If the acceleration of the cell is to the left in FIG. 6, the optical sensing system is preferably located and oriented so that the sensing planes $P_1$, $P_2$ and $P_3$ are vertical planes at right angles to the paper, so as to sense the instantaneous position of the ball with respect to the cell along the direction of acceleration of the cell.

In still another mode of use, the cell 50 may be turned with its longitudnal axis horizontal, corresponding to the arrangement shown schematically in FIG. 5. In this event the bouncing ball will be retained in its bouncing state between the striking surfaces 56 and 58 despite the influence of gravity on the ball. In this case the apparatus may be utilized as a gravimeter or a sensor of vertical translational acceleration of the cell by utilizing the optical sensing system in the orientation shown in FIG. 6, care being taken to provide that the arch of the flight of the ball and the positions and separations of the planes $P_1$, $P_2$ and $P_3$ are such that the ball traverses all three of these planes during each flight.

In still another mode of application, the cell 50 may be turned to the horizontal position in FIG. 6 with its longitudinal axis in the direction of acceleration of a vehicle carrying the equipment, which vehicle is constrained to move along a flat, straight, horizontal track. In this case the optical sensing planes $P_1$, $P_2$ and $P_3$ would be vertically disposed and spaced longitudinally along the horizontal direction of the applied motional acceleration.

Where information as to acceleration or accelerative forces along three mutually orthogonal coordinate directions is desired, three cells and systems such as are shown in FIG. 6 may be employed, operating independently of each other, the sensing planes for the three separate systems being mutually orthogonal with respect to each other. However, this is not essential, since information as to accelerational components along different directions may be derived by utilizing a plurality of sensing systems having sensing planes at different angles but sensing motion of the same ball in the same cell.

Figure 5A:
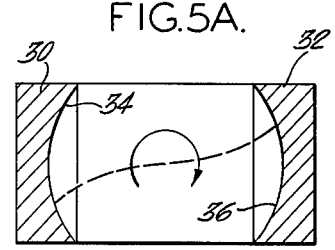

Another feature of the cell arrangement of the invention is that it is capable of maintaining the ball in its bouncing condition during rotation of the cell, at least for rotation rates below some predetermined maximum value. This means that the cell can be turned to different orientational positions without interfering with the bouncing condition of the ball. As represented in FIG. 5A, such rotation produces an S-shaped path of the ball, with the increasing cant of the striking surfaces toward their edges serving to maintain the ball bouncing in the cell.

In a preferred form of embodiment, the distances between adjacent optical sensing planes are the same, which simplifies computation and circuitry and enhances the versatility of the cell.

Suitable ways of computing the desired acceleration values will be apparent to one skilled in the art from the following analysis, with reference to the diagram of FIG. 8. In that figure 200 represents a driven bounce surface and 202 a passive bounce surface for a ball 206 shown in six different positions schematically representative of one round trip of the ball between the bounce surfaces. Assuming the ball is maintained bouncing between the two bounce surfaces, the three sensing planes $P_1$, $P_2$ and $P_3$, disposed normal to the plane of the drawing and parallel to each other, define a sensing axis A–A' normal to all three planes. In general, the sensing axis can be at any angle to the container cell and will sense the component of ball motion relative to the cell along the sensing axis. In this example the sensing axis is assumed to be along the longitudinal axis A–A' of the cell. Then, in the travel of the ball from plane $P_1$ to plane $P_2$, $$S_t = V_1 T_1 + \tfrac{1}{2} \overline{a_1} T_1^2, \tag{1}$$

where
$s_t$ = distance between adjacent sensing planes
$V_1$ = initial ball velocity with respect to the cell, along the sensing axis, at plane $P_1$
$\overline{a_1}$ = effective ball acceleration with respect to the cell along the sensing axis during the time $T_1 + T_2$ required for the ball to travel from $P_1$ to $P_3$; assuming the usual case in which acceleration does not change substantially over this distance, $\overline{a_1}$ is substantially the average acceleration in the interval $T_1 + T_2$.

The ball motion from plane $P_1$ to plane $P_3$ is described by the following:

$$2S_t = V_1(T_1+T_2) + \tfrac{1}{2} \overline{a_1}(T_1+T_2) \tag{2}$$

from which $$\overline{a_1} = 2St/T_1+T_2 \,(1/T_2 - 1/T_1) \tag{3}$$

Similarly $$\overline{a_2} = 2St/T_1'+T_2' \,(1/T_2' - 1/T_1') \tag{4}$$

wherein $\overline{a_2}$ is the effective acceleration of the ball with respect to the cell along the sensing axis during the time $T_1'+T_2'$ in which the ball passes from plane $P_3$ to plane $P_1$ on its return trip.

If the ball in flight is free of the accelerative force of gravity, as it may be in remote free space, $\overline{a_1}$ and $\overline{a_2}$, with appropriate polarities, represent the absolute acceleration of the cell in space along the sensing direction. If gravity is acting on the free ball, its component along the sensing axis must subtracted from $\overline{a_1}$ and $\overline{a_2}$ to obtain the absolute acceleration of the cell. If the cell is not accelerating but gravity is present, $\overline{a_1}$ and $\overline{a_2}$ will represent, and be a measure of, the component of gravity along the sensing direction.

Where the absolute motion of the cell is of interest, the values $(\overline{a_1}-g)$ and $(\overline{a_2}-g)$ may be computed to obtain the corresponding absolute motional accelerations $\overline{a}_{1m}$ and $\overline{a}_{2m}$, respectively, where $g$ is the component of the accelerations of gravity along the sensing axis. Under the asumption, sufficiently accurate for most applications, that $\overline{a}_{1m}$ and $\overline{a}_{2m}$ are constant over the respective time intervals $(T_1+T_2+T_3)$ and $(T_1'+T_2'+T_3')$, then the instantaneous absolute velocity $v_1$ of the cell along the sensing axis at the end of interval $T_3$ is:

$$v_1 = \overline{a_{1m}} (T_1+T_2+T_3) + v_0 \quad (7)$$

where $v_0$ is the instantaneous initial absolute velocity of the cell along the sensing axis at the beginning of the time interval $T_1$, and $T_3$ is the time interval during which the ball travels from $P_3$ to bounce surface 202 and back to $P_3$.

Similarly the instantaneous absolute velocity $v_2$ of the cell along the sensing axis at the end of the interval $T_3'$ is:

$$v_2 = \overline{a_{2m}} (T_1'+T_2'+T_3') + v_1 \quad (8)$$

The cell displacements $S_1$ and $S_2$ along the sensing axis from a fixed initial reference displacement $S_0$, at the ends of the respective time intervals $(T_1+T_2+T_3)$ and $(T_1'+T_2'+T_3')$ are then, respectively:

$$S_1 = S_0+v_0(T_1+T_2+T_3) + \tfrac{1}{2} \overline{a_{1m}} (T_1+T_2+T_3)^2 \quad (9)$$

$$S_2 = S_1+v_1(T_1'+T_2'+T_3') + \tfrac{1}{2} \overline{a_{2m}} (T_1'+T_2'+T_3')^2 \quad (10)$$

$S_l$ and the acceleration of gravity $g$ being known, the only measurements required are the times at which the ball arrives at the sensing planes.

To obtain continuing information as to acceleration, velocity and displacement, the computations are repeated for successive ball flights. A simple computation program would be as follows:

Step 1. Compute $\overline{a_{1m}}$ from $T_1$, $T_2$ and $T_3$ and $g$.
Step 2. Update $v_0$ to $v_1$ and store.
Step 3. Update $S_0$ to $S_1$ and store.
Step (3N−2). Compute $\overline{a_{nm}}$ and store.
Step (3N−1). Update $v_{n-1}$ and store.
Step 3N. Update $S_{n-1}$ to $S_n$ and store.

The nature of apparatus suitable for performing these computations is well known.

In the simplified apparatus shown in FIG. 6, only $T_1$ and $T_2$ are measured, but this is sufficient for computation of $\overline{a_1} \ldots \overline{a_n}$ by formula (3) above for gravimeter purposes, and for obtaining absolute cell accelerations $\overline{a_{1m}} \ldots \overline{a_{nm}}$ by subtracting the known value of $g$, where appropriate. Although the intervals during which $\overline{a_{nm}}$ is measured are spaced in time, this time spacing is known and indicated, for example by the optical sensor pulses produced at plane $P_3$. Accordingly, while the acceleration information is only updated once each bounce cycle, it is sufficiently accurate for many purposes.

FIGS. 9 and 10 illustrated by way of example one specific embodiment of cell 50, constructed in accordance with the invention. Referring to that figure, supporting block 400 is generally cylindrical in outer contour, and is provided with a central cylindrical recess 402 for receiving insulator block 406. A further vertical semicylindrical recess 408 is provided in a wall region of supporting block 400 to provide a passage from the interior to the exterior of the block for electric leads. Supporting block 400 is preferably of an electrically-conductive light-weight material such as aluminum, providing electrical shielding from the contents thereof.

Against the closed bottom of supporting block 400 and within recess 402 is placed a ground electrode 412, which may be a metal disc and which provides electrical contact to supporting block 400 and to the ground lead such as 80 of FIG. 6. Immediately above, and centered on, the ground electrode 412 there is preferably employed a damping pad 414 of resilient material such as rubber, which assists in damping-out vibrations of the cell and also provides a spring action for providing a pressure fit of the components mounted within supporting block 400.

Immediately above damping pad 414 is positioned the generally cylindrical, centrally-apertured insulator block 406, which fits slidably within supporting block 400 and bears against the upper surface of damping pad 414. A split cover 414A, 414B, suitably also of aluminum, is screwed to the top of supporting block 400 and holds insulator block 406, damping pad 414 and ground electrode 412 tightly in position against each other.

Insulator block 406 and cover 414A, 414B are centrally apertured to receive slidably and axially therein a metal drive-power electrode 420, a piezoelectric ceramic element 422 of disc-like shape, and the lower portion of the bottom bounce pedestal 424, one above each other in that order. Drive-power electrode 420 is connected to the bounce drive lead such as 82 in FIG. 6, the latter lead traversing recess 408 in the supporting block and a radial hole 426 in one side of the insulator block 406.

The piezoceramic element 422 may be of lead zirconite titanite, such as that known commercially as Clevite PZT-4, while pedestal 424 may be of hardened tool steel, for example. The top surface of pedestal 424 is configured, as by grinding and polishing, to have a spherical shape symmetrical about a vertical central axis. A typical radius of curvature of the surface in this example is about three-eighths inch, and a typical pedestal diameter about one-half inch.

On the top edge of pedestal 424 is mounted pedestal spacer 430, which is in the general form of a four-sided frame providing windows on each of its four sides which in this example are open but may be closed by transparent material in some cases. The frame is hollow and has circularly-apertured top and bottom surfaces for receiving the adjacent ends of the bounce pedestals and for providing a fixed spacing between them. More particularly, the spacer 430 comprises four vertical columns 431, one at each corner thereof and extending between the top and bottom of the spacer. The inner sides of the columns 431 extend inwardly slightly beyond the circular openings in the top and bottom of the spacer to provide eight lip supports such as 432, four at the top of the spacer and four at its bottom. The periphery of the top of the lower pedestal rests against the lower set of lip supports, and the periphery of the bottom of the upper pedestal rests against the upper set of lip supports. Preferably the top and bottom edges of the lower and upper pedestals respectively are provided with small peripheral bevels, such as 436, to provide an appropriate bearing surface and seal with the lip supports 432.

The top pedestal 438 may be identical with the lower pedestal 424, but is in inverted position with respect thereto and supported on the upper end of spacer 430, as described above. Above the upper pedestal is mounted a relatively massive backup block 440, which may be of steel, to provide inertial resistance and support for the upper pedestal. A generally cup-like cell top 442, which may also be of aluminum, is placed over the backup block 440, and four equiangularly spaced bores, such as 446, extend vertically through the sidewall of the cell top.

The cell is held together by four vertically-disposed tie rods such as 450, each of which extends at its lower end through a slot in the cover 414A, 414B and is threadedly secured in the insulator block 406, which may be of plastic material such as lucite or a filled silicone plastic, for example. The upper ends of the tie rods 450 extend through and above cell top 442 where they are provided with threaded portions engaged by corresponding threaded tension nuts such as 451. With the cell assembled as described hereinbefore, the nuts 451 are tightened to provide the requisite pressure for maintaining the cell parts in proper internal position.

In this example the lower surface of the lower pedestal 424 provides the top electrode contact to the piezoceramic element 422, this being the grounded contact in this instance. Connection to the ground lead from the pedestal is by way of the cover 414A, 414B and the supporting block 400. Accordingly, cover 414A, 414B is shaped and positioned so as to be in electrical contact with the lower pedestal 424, which contact may, if desired, be assured by a packing or shimming of conductive material inserted between cover and pedestal.

In a typical embodiment wherein the pedestals are about one-half inch in diameter, the bottoms of the concave depressions in the opposed pedestal surfaces may be spaced from each other by about 0.525 inch. The bouncing ball may be about one-eighth inch in diameter and made of a spring alloy, preferably preferably so as to be unaffected by strong magnetic fields and preferably having a high elastic limit. Cobalt watch-spring material having an elastic limit of at least about 200,000 psi is suitable, one commercially-available material for this purpose being known as Elgiloy.

Figure 11:
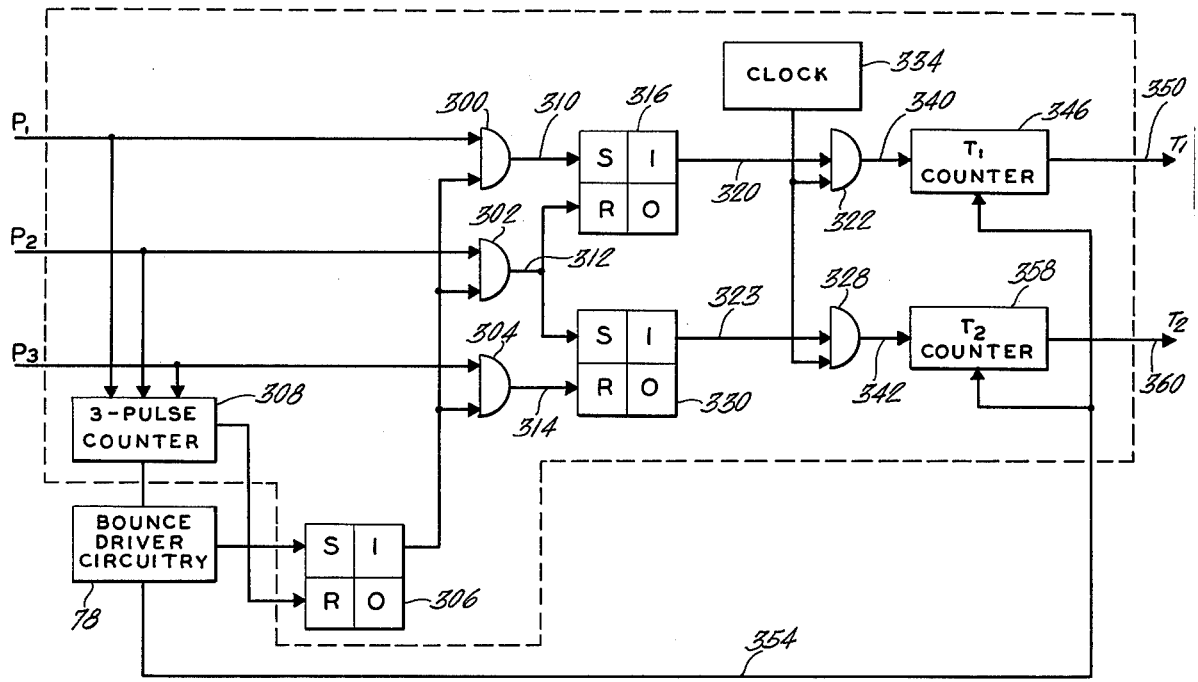
FIG. 11 is a block diagram of one form of timemeasuring circuit suitable for use in the embodiment of FIG. 6.

FIG. 11 represents, by way of example only, one simple form which the gating and time-measuring circuit 121 of FIG. 6 may take in one application. In this example it is assumed that the photoresponsive device 91 is of the type utilizing three separate sensing elements and has three corresponding, separate output leads for the three slit lines 112, 114 and 116, the pulses on the leads representing respectively the times at which the ball traverses the planes $P_1$, $P_2$ and $P_3$. The $P_1$, $P_2$ and $P_3$ pulses are each supplied to different input control terminals of three corresponding separate AND gates 300, 302 and 304, each of which is transmissive only when the other input control terminal thereof is also actuated. The latter input control terminals are so actuated only when the flip-flop device 306 produces an output.

Flip-flop device 306 is actuated by an output pulse supplied from bounce driver circuitry 78, and accordingly each of the AND gates 300, 302 and 304 is rendered transmissive of slit-resisting signals immediately after the occurrence of each bounce driver pulse. These AND gates resume their non-transmissive state when flip-flop 306 reverts to its original condition, which it does when reset by a pulse from three-pulse counter 308. The latter counter is also supplied with the $P_1$, $P_2$ and $P_3$ signals and with a timing pulse from bounce driver circuitry 78, and responds thereto to begin a new count upon the occurrence of each bounce driver pulse and to produce an output pulse only when all three of the pulse signals $P_1$, $P_2$ and $P_3$ have occurred; upon the occurrence of this condition, flip-flop 306 resets itself and the AND gates 300, 302 and 304 resume their non-transmissive state. In this way the $P_1$, $P_2$ and $P_3$ signals are transferred to respective lines 310, 312 and 314 during each successive upward transit of the ball in cell 50, but not during downward transits of the ball.

Flip-flop device 316 is supplied with the $P_1$ signal at its SET input terminal and with the $P_2$ signal at its RESET terminal, so that input control terminal 320 of AND gate 322 is actuated during the interval between the $P_1$ and $P_2$ pulses, that is during the time $T_1$, and is non-transmissive at other times. Similarly, input control terminal 323 of AND gate 328 is actuated by the operation of flip-flop 330 throughout the interval $T_2$ between the occurrence of each $P_2$ pulse and the following $P_3$ pulse.

Clock pulses from clock 334 are supplied to the other input control terminals of AND gates 322 and 328, with the result that output pulses are produced at AND gate output terminal 340 only during the intervals $T_1$, and at output terminal 342 of AND gate 328 only during the intervals $T_2$. The number of these clock pulses occurring during the respective intervals $T_1$ and $T_2$ is a direct indication of the duration of the intervals, the repetition period of the clock being accurately known and predetermined. The clock pulses on lead 322 are supplied to $T_1$ counter 346, which counts the pulses to produce the $T_1$ signal at output lead 350, after which the counter is reset by a pulse from bounce driver circuitry 78 supplied over reset line 354. Similarly, the clock pulses produced at lead 342 are counted in the $T_2$ counter 358 to produce the $T_2$ signal at output lead 360, the counter 358 also being used by the next bounce driver pulse over lead 354. The $T_1$ and $T_2$ signals are then utilized as described hereinbefore with particular reference to FIG. 6.

Figure 12:
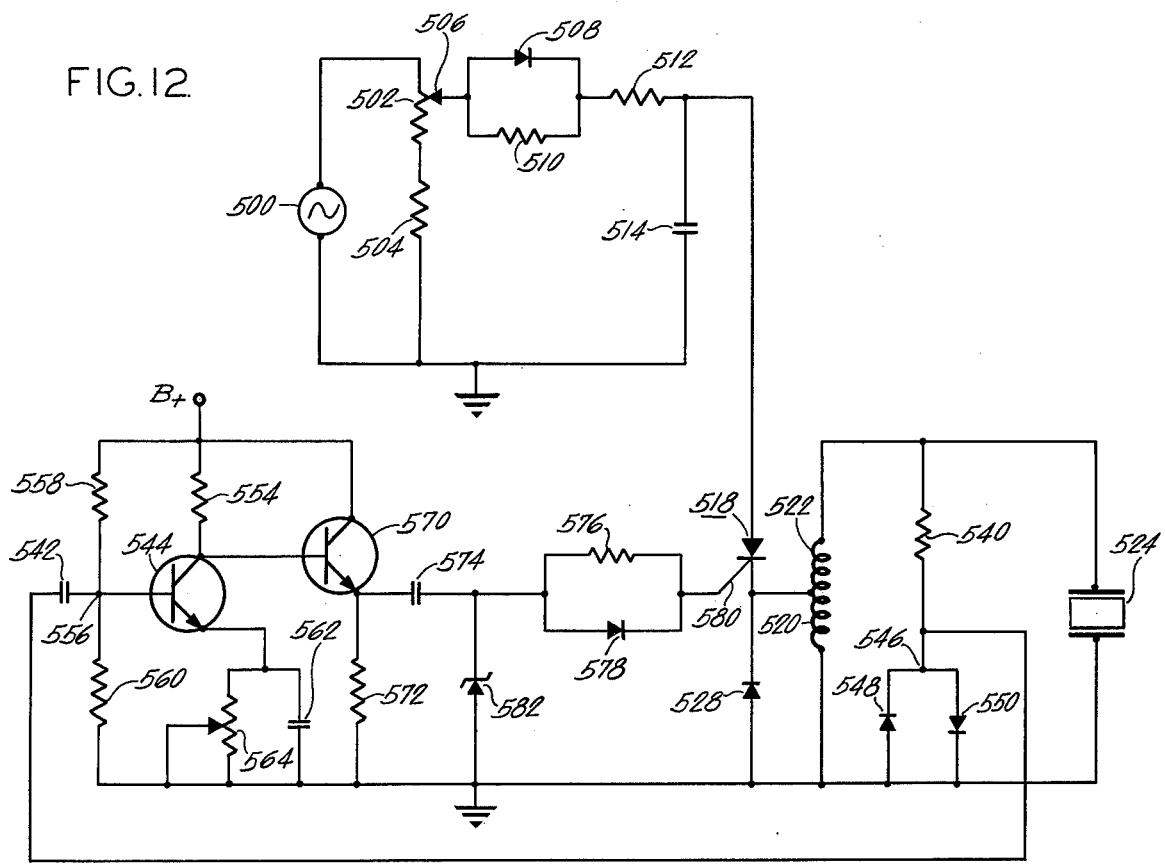
FIG. 12 is an electrical schematic diagram of one form of bounce driver circuitry suitable for use in the embodiment of FIG. 6.

FIG. 12 illustrates one particular example of the circuit which may be used as the bounce driver circuitry 78 of FIG. 6. An alternating current source 500 is connected to and across the series combination of an adjustably-tapped resistor 502 and a fixed resistor 504, variation of the position of tap 506 on adjustably-tapped resistor 502 providing an adjustment of the magnitude of the voltage passed on to the remainder of the circuit. Tap 506 is connected through the parallel combination of rectifier 508 and higher resistance 510, and by way of a small-valued series resistor 512, to the upper plate of capacitor 514, the opposite plate of which is connected to a source of reference potential designated as ground, which is also the lower terminal of resistor 504. Rectifier 508 is poled with its cathode toward the upper plate of capacitor 514 so as to charge the plate positively with half-waves of direct current.

Capacitor 514 is connected across the anode and cathode terminals of silicon controlled rectifier (SCR) device 518 by way of the primary coil portion 520 of autotransformer 522. Accordingly, whenever SCR 518 is rendered conductive by a pulse signal on its gate electrode, capacitor 514 is discharged through transformer primary 520, producing a high voltage pulse which is applied across the piezoceramic element 524, which may be the same element 422 described in connection with FIGS. 9 and 10. Silicon diode 528, connected across transformer primary 520, prevents excessive kickback voltage from developing across the latter primary which might damage the SCR. Accordingly, assuming capacitor 514 has been charged, triggering of SCR 518 will produce a high-voltate pulse across the piezoceramic element. Typical voltages for this portion of the circuit are 400 volts D.C. across capacitor 514 and about 1200 peak volts applied across the piezoceramic element 524.

SCR 518 is normally in its non-conductive condition, and is turned on only in response to a triggering pulse generated by piezoceramic element 524 when the latter element is struck by the bouncing ball. When the ball strikes the piezoceramic element, a negative pulse is produced on its upper, ungrounded electrode which is supplied through series resistor 540 and series coupling capacitor 542 to the base of an amplifying transistor 544. The junction point 546 between resistor 540 and capacitor 542 is preferably connected to ground by each of a pair of oppositely-poled silicon diodes 548 and 550, which limit the voltage at tap 546 to a maximum value of about 0.6 volt and thus serve to prevent strong drive pulse signals from passing to the input of amplifier transistor 544.

Transistor 544 is of the NPN type, and is supplied with collector operating potential such as +12 volts from a source designed as B+ by way of a collector load resistor 544. Base bias for the transistor is provided from a tap point 556 on a voltage divider comprising the series combination of resistors 558 and 560 connected between B+ and ground. The emitter of transistor 544 is connected to ground by way of a large-valued capacitor 562 in parallel with a variable resistor 564. Capacitor 562 stabilizes the bias for transistor 544, and variable resistor 564 constitutes a sensitivity control for varying the gain of the transistor and therefore the magnitude of ball-impingement impulse required to trigger the SCR 518.

The amplified positive pulse from the collector of transistor 544 is supplied to the base of a transistor 570 connected in the common-emitter circuit configuration. The emitter load resistor 572 is connected to ground, and the stage acts as an emitter-follower driver and impedance matching stage. The output from the emitter thereof is supplied through coupling capacitor 574 and the parallel combination of resistor 576 and diode 578 to the gate electrode 580 of the SCR 518 to trigger it and produce a bounce drive pulse immediately thereafter, as described previously. Resistor 576 and diode rectifier 578 serve a protective function in blocking the circuit from the anode of SCR 518 to ground by way of gate electrode 580, and the zener diode 582, connected between ground and the junction between capacitor 574 and diode rectifier 578, prevents the voltage at that junction point from rising above a predetermined level, such as 18 volts for example.

While some of the high voltage produced during the driver pulse may tend to be fed back immediately to the input of the amplifying stage 544, it is not effective to produce retriggering of the SCR since capacitor 514 has recently been discharged and the next successive half-wave of charging voltage for the capacitor has not yet occurred. Use of half-waves of supply voltage, rather than steady D.C. voltage, assures that the anode potential of the SCR 518 will periodically drop substantially to zero value to assure turning-off of the SCR at the desired time.

The recurrence rate of the half-waves of supply voltage should be high compared with the rate at which the SCR is to be triggered, and a 60 cycle A.C. supply voltage rectified to produce 120 half-waves per second is adequate for a typical case in which the bounce driver pulses are to be produced at a 20 cycle per second rate.

Typically the ball is in contact with the drive pedestal for about eight microseconds, producing a mechanical shock pulse which takes of the order of two microseconds to operate the piezoceramic element; and a few more microseconds are required for the signal to propagate through the circuitry and for the bounce drive impulse to propagate to the pedestal surface. Typically, the bounce impulse is produced about 6 microseconds after the pedestal is first impinged by the ball, and in any event before the ball again leaves the pedestal.

The magnitude of bounce impulse utilized depends upon the particular application, and particularly upon the interpedestal spacing and the maximum acceleration expected. In general, in the form of the invention specifically described it is desirable for the ball to strike both pedestals even under the maximum retarding acceleration to be encountered, but increases in bounce impulse beyond those sufficient to satisfy this criterion generally result in a decrease in the accuracy or sensitivity of the entire measuring system. Accordingly, the bounce impulse will normally be regulated to a value just sufficient to provide bouncing from both pedestals under the maximum acceleration condition to be encountered in the contemplated operation.

It will be appreciated that the various specifically described forms of the embodiment of the invention are by way of example. For example, not only may the bounce driver circuitry take any of many forms different than that specifically disclosed, but the imparting of energy to the bouncing ball to maintain it in its bouncing condition may be provided in entirely other ways, for example by means of controlled cyclic automatic shaking of the cell by electromagnetic means, synchronized with the ball round-trip transit time. Similarly, the ball-position sensing apparatus, the time-measuring apparatus and the computation equipment may take any of a large variety of forms without departing from the invention.

Also, the nature and number of the pedestals used and the construction of the cell may differ substantially from the arrangement shown in the specific example. Merely by way of further examples, the pedestal may have a flat region near the center, with the curved portion occurring only at the extreme periphery; one pedestal surface may be curved and the other may be flat; in some cases only one pedestal need be used, the ball returning to the pedestal under the action of the applied acceleration, such as gravity, without relying upon the bouncing from an upper pedestal; in some instances two curved pedestals may be employed having axes directed upward at an intersecting angle with each other; and, in some cases, the pedestal surfaces may be extended nearly to the size of hemispheres, the piezoelectric driver element then covering a major portion of the outer side of one pedestal to provide bounce drive no matter where the pedestal is struck by the ball. Other forms and arrangements of pedestal surface for producing bounce stabilization will occur to one skilled in the art in view of the foregoing disclosure.

Accordingly while the invention has been described with reference to specific embodiments thereof in the interests of complete definiteness, it will be understood that it may be embodied in a variety of forms diverse from those specifically described without departing from the spirit and scope of the invention as defined by the appended claims.

What is claimed is:

1. In inertial sensor apparatus comprising means for bouncing a body repetitively between a pair of generally opposed surfaces and for permitting said body to move substantially free of constraints and contacts between successive bounces, and further comprising means for sensing and indicating the position and/or motion of said body between said successive bounces, the improvement according to which one of said generally opposed surfaces has a non-planar configuration for opposing departures toward an edge of said one surface of the point thereof on which said body bounces.

2. The apparatus of claim 1, in which said one surface is provided with an inward cant which increases toward an edge thereof.

3. The apparatus of claim 2, in which said inward cant increases toward all edges of said one surface.

4. The apparatus of claim 3, in which said one surface is substantially a concave figure of revolution.

5. The apparatus of claim 4, in which said one surface is substantially spherical.

6. The apparatus of claim 1, in which said means for bouncing said body comprises means for applying a mechanical impulse to either of said generally-opposed surfaces to provide said body with a greater velocity than it would have from mere passive rebounding 7. The apparatus of claim 6, in which the other of said surfaces is also configured to oppose departures toward the edge thereof of the point thereof on which said body bounces.

8. The apparatus of claim 1, comprising means for sensing the instantaneous position of said body while it is free of mechanical constraint.

9. In apparatus comprising a container having two resilient opposed interior striking surfaces, a resilient free mass within said container, means for bouncing said mass back and forth between said surfaces along transit paths free of said container, and means for detecting, and producing a signal indicative of, relative motion of said mass with respect to said container occurring when said mass is free of contact with said container, the improvement according to which said striking surfaces are concave so as to oppose deviations toward the edges of said striking surfaces of the points of impingement of said mass upon said striking surfaces.

10. The apparatus of claim 9, in which said surfaces are substantially figures of revolution.

11. The apparatus of claim 10, in which said surfaces are substantially spherical.

12. The apparatus of claim 9, in which said means for bouncing said mass comprises means for applying, to at least one of said surfaces, mechanical impulses timed to coincide with impingement thereon of said mass for providing said mass with a velocity greater than it would have from mere passive rebounding.

13. In apparatus for sensing the relative motion between a frame and a free body, comprising a container cell mounted on said frame and having a pair of opposed striking surfaces, a resilient ball in said cell, means for bouncing said ball back and forth between said surfaces so that it is substantially free of constraints between successive bounces, and means for sensing, and producing signals representative of, the position of said ball relative to said frame while said ball is in transit between said surfaces, the improvement according to which said striking surfaces are concave toward each other so as to oppose departures toward the edges of said surfaces of the points of impingement of said ball thereon.

14. The apparatus of claim 13, in which said surfaces are substantially figures of revolution.

15. The apparatus of claim 14, in which said surfaces are of substantially the same size and shape.

* * * * *